(12) United States Patent
Ji et al.

(10) Patent No.: US 8,055,439 B2
(45) Date of Patent: Nov. 8, 2011

(54) SYSTEM FOR PROVIDING FUEL-EFFICIENT DRIVING INFORMATION FOR VEHICLES

(75) Inventors: Sang Woo Ji, Seoul (KR); Dong Jin Shin, Seoul (KR); Jae Hoon Jeong, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 570 days.

(21) Appl. No.: 12/276,618

(22) Filed: Nov. 24, 2008

(65) Prior Publication Data

US 2009/0157290 A1 Jun. 18, 2009

(30) Foreign Application Priority Data

Dec. 18, 2007 (KR) .................. 10-2007-0133574

(51) Int. Cl.
*G06G 7/70* (2006.01)
(52) U.S. Cl. ..................... 701/123; 701/213
(58) Field of Classification Search .......... 701/201, 701/207, 208, 209, 213; 340/995.19
See application file for complete search history.

(56) References Cited

U.S. PATENT DOCUMENTS

| 6,128,574 A * | 10/2000 | Diekhans ............... 701/209 |
| 7,865,298 B2 * | 1/2011 | Macneille et al. ......... 701/201 |
| 7,882,789 B2 * | 2/2011 | Kumar et al. ............ 105/27 |

* cited by examiner

*Primary Examiner* — Richard M. Camby
(74) *Attorney, Agent, or Firm* — Edwards Angell Palmer & Dodge LLP; Peter F. Corless

(57) ABSTRACT

A system for providing fuel-efficient driving information for a vehicle includes a fuel-efficient driving area calculation unit and a display unit. The fuel-efficient driving area calculation unit calculates a variable fuel-efficient driving area, which is divided into economical, semi-economical, and uneconomical regions, depending on the increase or decrease of the speed of the vehicle, calculates a current fuel efficiency of the vehicle, receives information about the type and condition of a road from a GPS, and adjusts the regions in the fuel-efficient driving area to prompt the driver to increase or decrease the vehicle speed in advance. The display unit displays the fuel-efficient driving area using information calculated by the fuel-efficient driving area calculation unit, and indicates the current fuel efficiency using the regions.

7 Claims, 6 Drawing Sheets

[FIG 1]
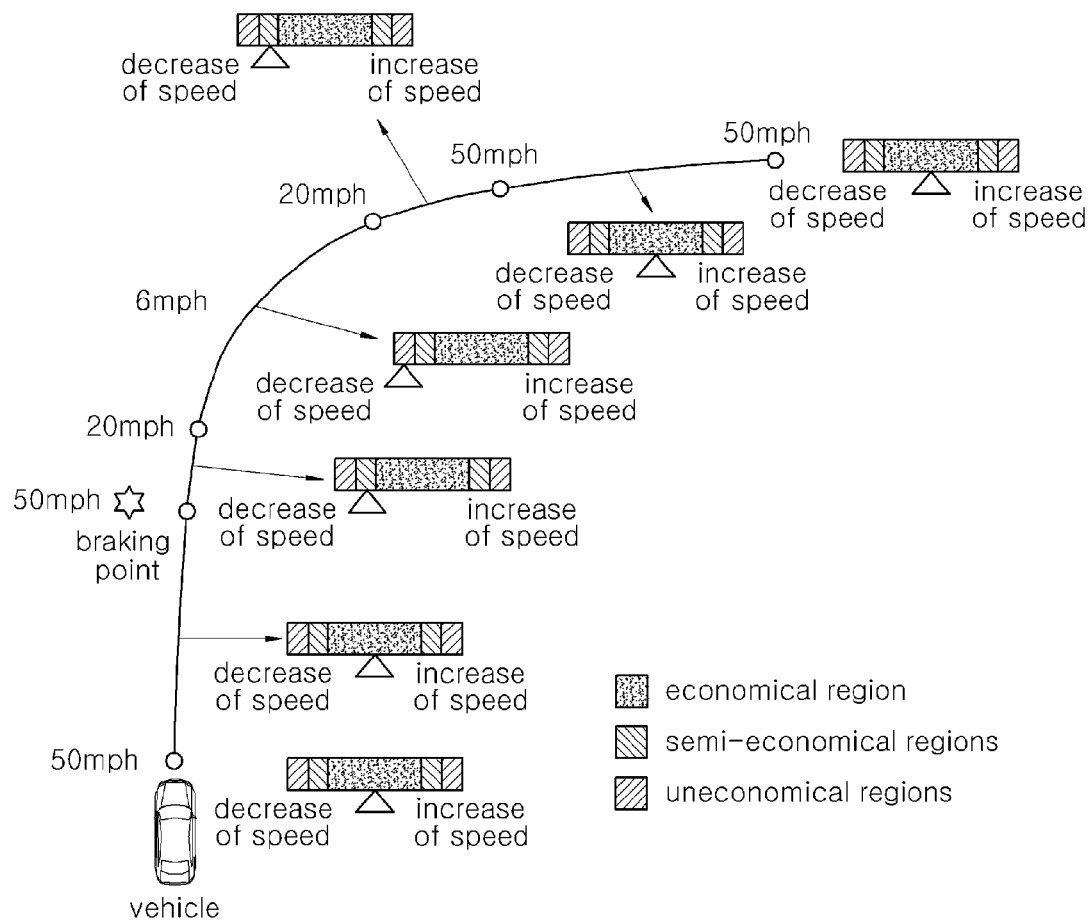

[FIG 2]
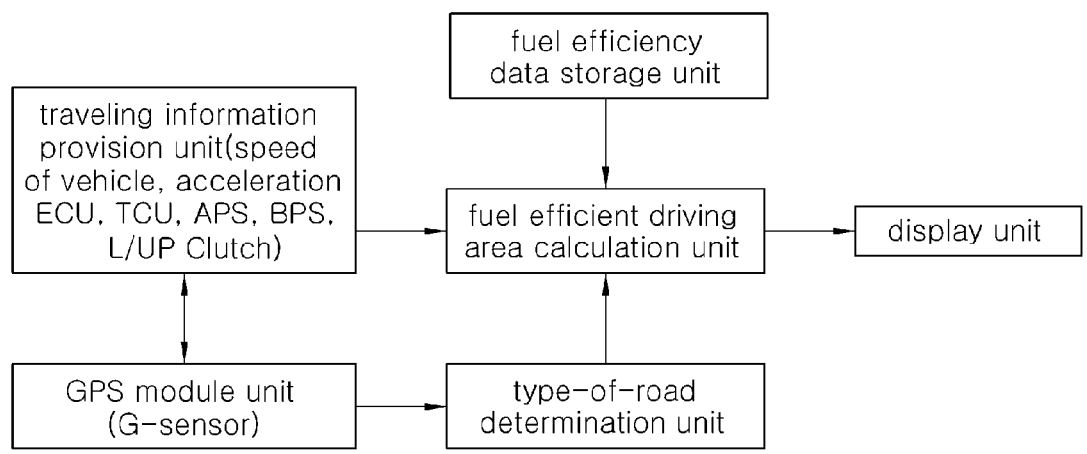

[FIG 3]
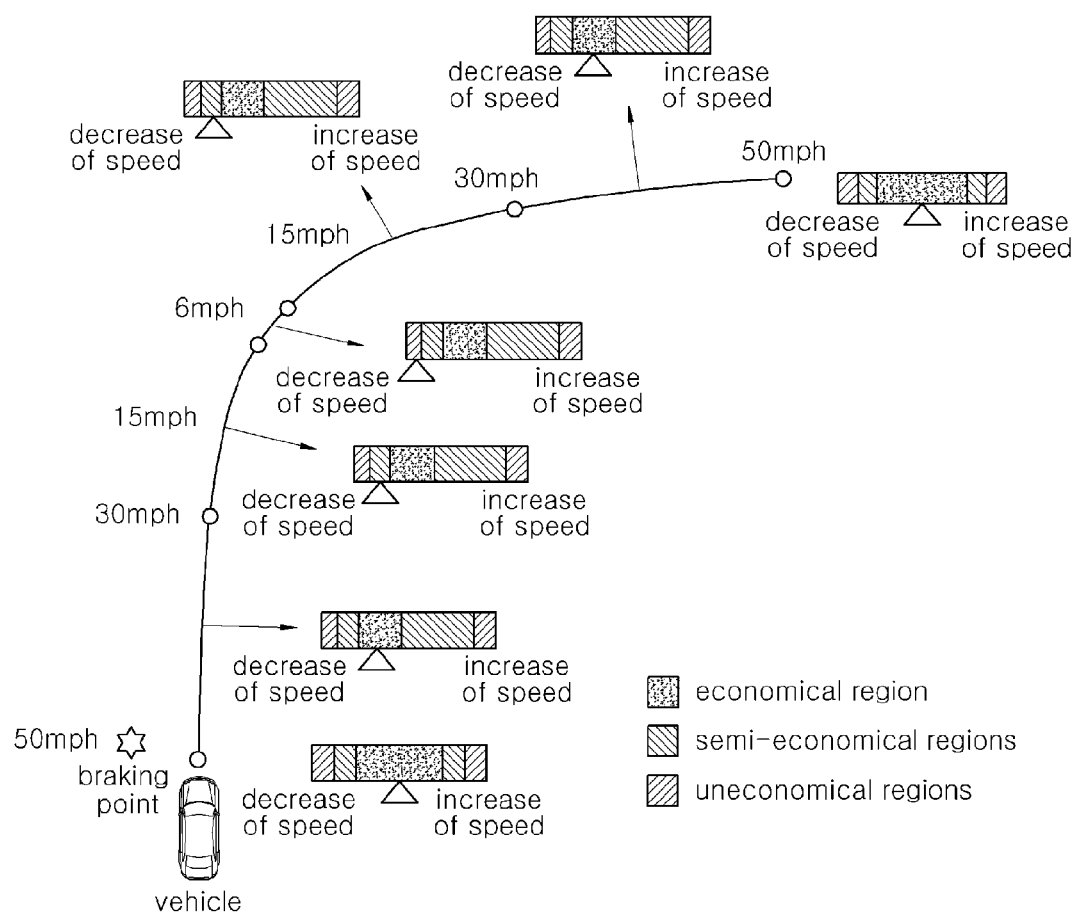

[FIG 4]
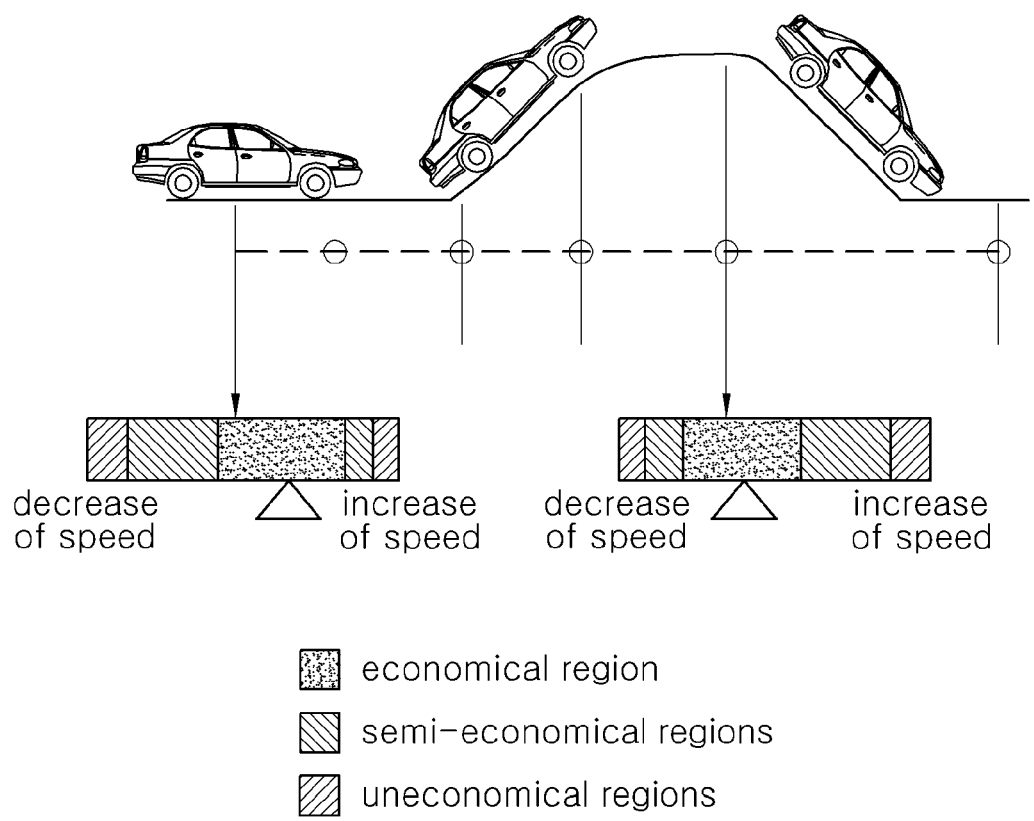

[FIG 5]

| detailed fuel efficient driving information | | | | | |
|---|---|---|---|---|---|
| distribution of driving regions | green | 35% | distribution of speed of vehicle | 0~30kph | 20% |
| | | | | 30~60kph | 18% |
| | yellow | 45% | | 60~90kph | 35% |
| | | | | 90~120kph | 22% |
| | orange | 20% | | above 120kph | 5% | display of driving regions →

← display of distribution of speed of vehicle

[FIG 6]
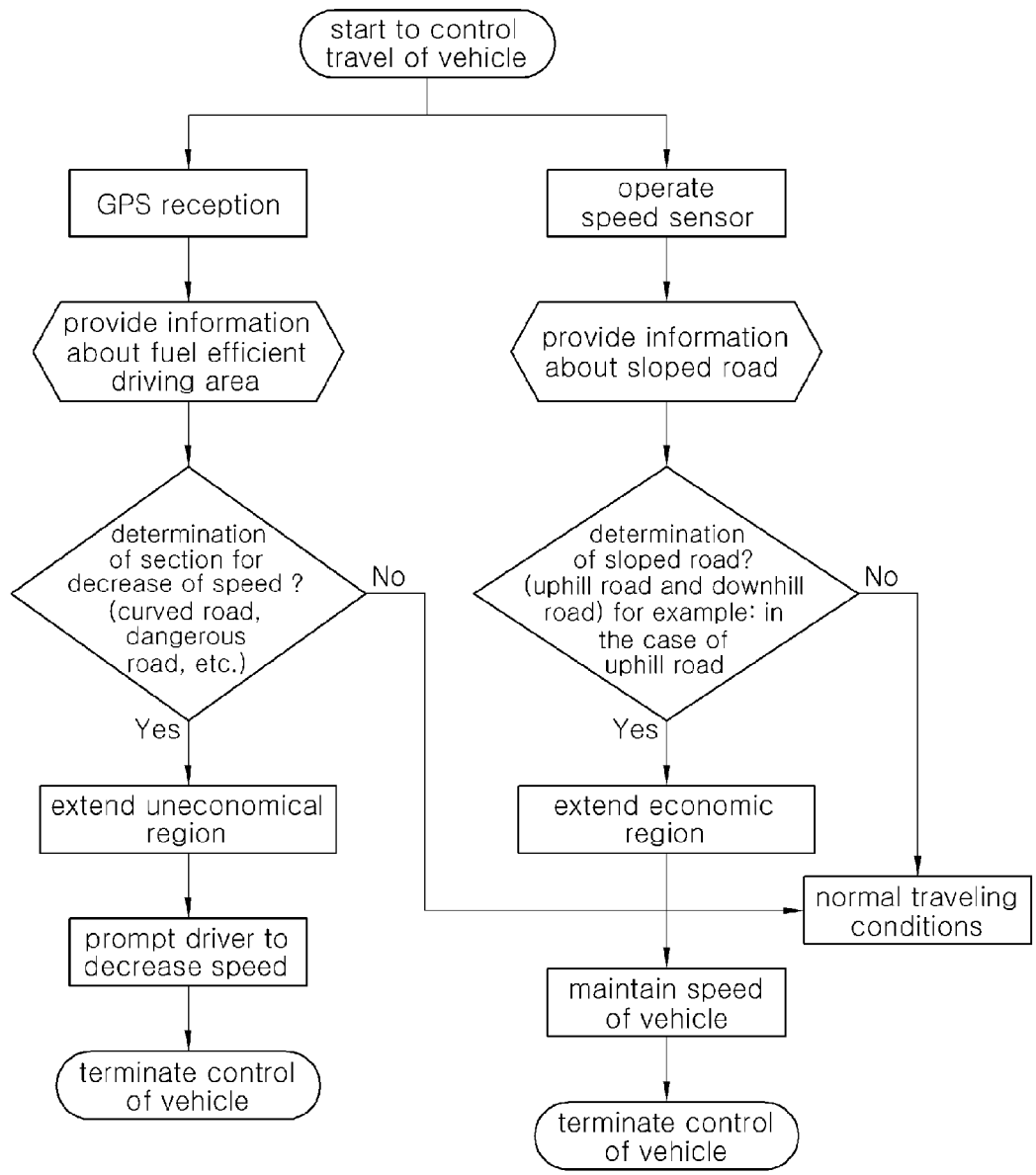

SYSTEM FOR PROVIDING FUEL-EFFICIENT DRIVING INFORMATION FOR VEHICLES

CROSS-REFERENCE TO RELATED APPLICATION

This application claims under 35 U.S.C. §119(a) the benefit of Korean Patent Application No. 10-2007-0133574 filed Dec. 18, 2007, the entire contents of which are incorporated herein by reference.

BACKGROUND

1. Technical Field

The present invention relates generally to a fuel efficient driving technique for a vehicle, and more particularly to a system for fuel-efficient driving, which provides a driver with information on a road so that the vehicle can be operated in an optimal fuel-efficiency.

2. Related Art

Optimization of fuel efficiency of vehicles has become a very important issue for automobile manufacturers and consumers. Intensive researches have been made to provide fuel efficient vehicles by, for example, developing a lean burn engine or increasing the efficiency of an engine and a transmission.

One of the techniques for providing fuel-efficient driving is to provide information about the current fuel efficiency of a vehicle to a display unit such as to allow the driver to determine whether to increase the speed of the vehicle, as disclosed in U.S. Pat. No. 4,166,382.

A conventional system for providing fuel-efficient driving information, as disclosed in U.S. Pat. No. 6,092,021, directs a driver to increase or decrease the speed of the vehicle by displaying uneconomical, semi-economical, and economical regions on the basis of information about fuel efficiency and power-related information measured from a sensor or sensors in the engine or transmission and power-related information acquired from an accelerator and a brake pedal.

The conventional system for providing fuel-efficient driving information is described in detail with reference to FIG. 1.

The conventional system classifies driving regions into uneconomical, semi-economical and economical regions according to the degree of acceleration and deceleration for each road section and indicates the current fuel efficiency of the vehicle falls within one of the ranges to enable the driver to consider the current fuel efficiency state in increasing or decreasing the speed of the vehicle.

However, the conventional system applies the criteria for general rectilinear roads curved and inclined roads, which may lower the reliability of the system and cause vehicle accidents.

That is, in the case of a curved road, it is advantageous in terms of fuel efficiency to decrease the speed of a vehicle well before the vehicle enters a corner of the curved road and slowly decrease the speed until the vehicle passes the corner completely. However, the conventional system indicates that the current fuel efficiency is in an economical region if the speed of the vehicle is maintained immediately before the vehicle enters the corner, but indicates that the current fuel efficiency is in a semi-economical or uneconomical region if the speed of the vehicle is decreased before the vehicle enters the corner. Accordingly, in the case where a driver heeds the information that is provided from the system, he or she decreases the speed rapidly when the vehicle completely enters the corner, causing a decrease in fuel efficiency. For example, a driver is aware that a road ahead is a curved road when his or her vehicle has entered the curved road while traveling at a speed of 50 mph, and starts to brake the vehicle. In this case, the speed of the vehicle is rapidly decreased from 50 mph to 20 mph and is then rapidly decreased from 20 mph to 6 mph, which causes a decrease in fuel efficiency.

In the same manner, in the case of an inclined road, it is efficient to acquire sufficient power before the vehicle enters the inclined road and ascend the incline using a momentum generated by the power. However, the conventional system is problematic in that fuel efficiency is decreased because an accelerator is excessively pushed down due to the lack of drive force on the inclined road.

The above information disclosed in this Background section is only for enhancement of understanding of the background of the invention and therefore it may contain information that does not form the prior art that is already known in this country to a person of ordinary skill in the art.

SUMMARY

Accordingly, the present invention has been made keeping in mind the above problems occurring in the prior art, and the present invention is directed to a system for providing information of fuel efficiency in consideration of traveling characteristics on both a curved road and an inclined road.

According to an embodiment, a system for providing fuel-efficient driving information for a vehicle includes: a fuel-efficient driving area calculation unit for calculating a variable fuel-efficient driving area, which is divided into economical, semi-economical, and uneconomical regions, depending on the increase or decrease of speed of the vehicle, calculating a current fuel efficiency of the vehicle, receiving information about the type and condition of a road from a GPS, and adjusting the regions in the fuel-efficient driving area to prompt the driver to increase or decrease the speed of a vehicle; and a display unit for displaying the fuel-efficient driving area using information calculated by the fuel-efficient driving area calculation unit, and indicating the current fuel efficiency using the regions.

On an inclined road, it is preferred that the fuel-efficient driving area calculation unit adjusts the economical region towards the direction of the increase of speed at a predetermined location or time point before the vehicle enters an uphill road and adjusts the economical region toward the direction of the decrease of speed from a predetermined location or time point at which the vehicle enters a downhill road.

On a curved road, it is preferred that the fuel-efficient driving area calculation unit, at a predetermined location or time point before the vehicle enters the curved road, adjusts the economical region towards the direction of the decrease of speed, in order to prompt the driver to decrease the speed of the vehicle in advance before the vehicle enters the curved road. Preferably, in this case, the range of the economical region may be reduced and that of the semi-economical region may be increased.

The system may further include a three-axis gyro sensor so that the fuel-efficient driving area calculation unit more accurately detects inclined roads.

It is preferred that the display unit classify accumulated fuel efficiency information according to fuel-efficient driving area, and display statistical data thereof, and that the display unit classify accumulated speed information according to a predetermined range thereof and display statistical data thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other objects, features and advantages of the present invention will be more clearly understood from the following detailed description taken in conjunction with the accompanying drawings, in which:

FIG. 1 is a diagram illustrating an operation mode of a prior art system for providing fuel-efficient driving information for vehicles in case of a curved road;

FIG. 2 is a block diagram showing the construction of a system for providing fuel-efficient driving information for vehicles according to an embodiment of the present invention;

FIG. 3 is a diagram illustrating an operation mode of a system according to an embodiment of the present invention in case of a curved road;

FIG. 4 is a diagram illustrating an operation mode of a system according to an embodiment of the present invention in case of an inclined road;

FIG. 5 is a diagram showing an example of information displayed by a system according to an embodiment of the present invention; and FIG. 6 is a flowchart illustrating a process of implementing a system according to an embodiment of the present invention.

DETAILED DESCRIPTION

Hereinafter reference will now be made in detail to various embodiments of the present invention, examples of which are illustrated in the accompanying drawings and described below.

FIG. 2 is a block diagram showing the construction of a system for providing fuel-efficient driving information for vehicles according to an embodiment of the present invention.

The system for providing fuel-efficient driving information for vehicles may include a traveling information provision unit for collecting and providing information about the current speed of a vehicle and the operation state of an engine and a transmission, a fuel efficiency data storage unit storing speed change pattern data, a type-of-road determination unit for determining the type and conditions of a road using information received from a GPS module unit, a fuel-efficient driving area calculation unit for calculating a fuel-efficient driving area, which is divided into uneconomical, semi-economical and economical regions, for each road section and the current fuel efficiency of the vehicle using both the information provided from the traveling information provision unit and the data provided from the fuel efficiency data storage unit, and calculating the economical region so that the increase or decrease of speed is prompted in advance before the vehicle enters either a curved road or an inclined road, and a display unit for receiving information, which is obtained through the calculation of the fuel-efficient driving area calculation unit, displaying the fuel-efficient driving area according to the increase or decrease of speed, and indicating the current fuel efficiency with the regions.

It is preferred that the traveling information provision unit be configured to collect information from a vehicle speed sensor, an engine control unit (ECU), a transmission control unit (TCU), an accelerator position sensor (APS), a brake position sensor (BPS) and a damper clutch.

In the case of a rectilinear road, the fuel-efficient driving area calculation unit receives the information from the traveling information provision unit, and obtains the current fuel efficiency by comparing the received information with the speed change pattern data, which is stored in the fuel efficiency data storage unit. As an example, the fuel-efficient driving area is determined by comparing a gear shift point, the operation of the damper clutch, and the degree of opening of a throttle valve with the speed of the vehicle, and the current fuel efficiency is indicated.

In the case of a curved road, in order to prompt a driver to decrease the speed of the vehicle, the curved road is determined using the GPS module unit and the type-of-road determination unit and, subsequently, the economical region is displayed so as to be extended in the direction of the decrease of speed. Finally, the display unit displays the uneconomical, semi-economical, and economical regions of the fuel-efficient driving area, in which the left portion thereof is set to the decrease of speed and the right portion thereof is set to the increase of speed, and provides a notification of the necessity of the increase or decrease of speed to the driver by indicating the current fuel efficiency using the regions.

The above-described operation is described in more detail with reference to FIG. 3. The economical region is adjusted in advance towards the direction of the decrease of speed from a predetermined location or time point before the vehicle enters the curved road. In this case, the semi-economical region may be extended. According to the displayed fuel-efficient driving area, the driver can start to brake the vehicle from the predetermined location or time point before the vehicle enters the curved road. Accordingly, a gradual decrease of speed can be achieved and thus fuel efficiency can be increased, while preventing the rapid decrease of speed, a problem associated with the prior art system.

For example, according to the system according to the embodiments of the present invention, since the economical region is adjusted in advance towards the direction of the decrease of speed from the predetermined location or time point before the vehicle enters the curved road, the driver starts to decrease the speed of the vehicle at 50 mph, and thus the vehicle enters the curved road in the state in which the speed of the vehicle is decreased to 30 mph. Conventionally, as shown in FIG. 1, braking starts when the vehicle completely enters the curved road at a speed of 50 mph, and the rapid decrease of speed occurs on the curved road. However, according to the present systems, the vehicle enters the curved road in the state in which the speed thereof is decreased to 30 mph. Subsequently, the vehicle passes through the curved road while the speed thereof is gradually decreased from 15 mph to 6 mph. Accordingly, unlike the conventional case, the present systems are advantageous in that the rapid decrease of speed is mitigated or prevented, and thus the fuel efficiency is improved, and in that, in the displayed fuel-efficient driving area, the semi-economical region is displayed for a period of time longer than that for which the uneconomical region is displayed.

FIG. 4 is a diagram illustrating an information provision method in an inclined road section. It is preferred that the type-of-road determination unit determine whether a road is inclined and the incline of the road, and that the fuel-efficient driving area calculation unit calculate the fuel-efficient driving area so that the economical region is adjusted towards the direction of the increase of speed when the vehicle travels on an uphill road but is adjusted towards the direction of the decrease of speed when the vehicle travels on a downhill road. In order to enable the type-of-road determination unit to accurately determine whether the road is inclined, it is preferred that the GPS module unit be provided with a three-axis Gyro (G) sensor.

That is, the speed of the vehicle is increased in advance before the vehicle enters the inclined road using both satellite information, which is obtained using a GPS, and incline information, which is obtained using an additional three-axis G-sensor, and is slightly increased using the reaction force when the vehicle travels on the downhill road, and thus fuel efficiency is improved. That is, the economical region is adjusted towards the direction of the increase of speed immediately before the vehicle enters the inclined road so that the increase of speed can be prompted, but is adjusted towards the direction of the decrease of speed from the starting point of a downhill road, so that the unnecessary increase of speed can be prevented.

In addition to the above-described curved and inclined roads, the present systems can be usefully used in other various roads. For example, it can be used in traveling in areas in the city in which a vehicle must stop due to a traffic signal. Furthermore, the present systems can detect, using a GPS, all situations in which a rapid increase or decrease of speed is expected, such as the case where the rapid decrease of speed must be conducted due to a rapid variation in the road environment, and enable a driver to appropriately respond to the situations, thus improving fuel efficiency.

FIG. 5 illustrates an example of information displayed by a system according to an embodiment of the present invention. It is preferred that the display unit perform calculation on the distribution of accumulated fuel efficiency information with respect to both the fuel-efficient driving area and the speed of the vehicle and that it display the results of the calculation. Preferably, the display unit may not only display the percentages of the accumulated fuel efficiency information, as well as the percentages of current fuel efficiency information, for the respective regions, but also display the percentages of the speed of the vehicle for respective vehicle speed ranges. Accordingly, the driver can be made aware of his or her driving habits and be prompted to develop good habits for the improvement of the fuel efficiency in the future.

FIG. 6 is a flowchart illustrating a process of implementing a system for providing fuel-efficient driving information according to an embodiment of the present invention. A curved road is detected using the GPS module unit. In the case of the curved road, the semi-economical regions are increased in advance, and thus the decrease in speed is prompted. In the case of an inclined road, the inclined road is determined using the GPS module unit and the G-sensor. The economical region is extended in the direction of the increase of speed on the uphill road so that the increase of speed is maintained, but is extended in the direction of the decrease of speed on the downhill so that the decrease of speed is maintained.

According to the present systems, an actual fuel-efficient driving area is indicated according to whether the road is a curved road or is inclined, so that a driver's confidence is increased, with the result that fuel efficiency can actually be improved. Furthermore, because the three-axis G-sensor is provided in the GPS module unit, incline information can be more accurately acquired. In addition, the accumulated fuel efficiency information, as well as the current fuel efficiency information, is indicated, and thus the necessity for the improvement of driving habits in the future can be also indicated.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A system for providing fuel-efficient driving information for a vehicle, the system comprising:
   a fuel-efficient driving area calculation unit for calculating a variable fuel-efficient driving area, which is divided into economical, semi-economical, and uneconomical regions, depending on an increase or decrease of speed of the vehicle, calculating a current fuel efficiency of the vehicle, receiving information about the type and condition of a road from a Global Positioning System (GPS), and adjusting the regions in the fuel-efficient driving area to prompt the driver to increase or decrease the vehicle speed in advance; and
   a display unit for displaying the fuel-efficient driving area using information calculated by the fuel-efficient driving area calculation unit, and indicating the current fuel efficiency with the regions.

2. The system as set forth in claim 1, wherein, on an inclined road, the fuel-efficient driving area calculation unit adjusts the economical region towards a direction of an increase of speed at a predetermined location or time point before the vehicle enters an uphill road and adjusts the economical region towards a direction of a decrease of speed from a predetermined location or time point at which the vehicle enters a downhill road.

3. The system as set forth in claim 1, wherein, on a curved road, the fuel-efficient driving area calculation unit adjusts the economical region towards a direction of a decrease of speed at a predetermined location or time point before the vehicle enters the curved road.

4. The system as set forth in claim 3, wherein the range of the economical region is reduced and the range of the semi-economical region is extended.

5. The system as set forth in claim 1, further comprising a three-axis gyro sensor so that the fuel-efficient driving area calculation unit more accurately detects inclined roads.

6. The system as set forth in claim 1, wherein the display unit classifies accumulated fuel efficiency information according to fuel-efficient driving area, and displays statistical data based on the accumulated fuel efficiency information.

7. The system as set forth in claim 1, wherein the display unit classifies the accumulated speed information at regular intervals according to speed, and displays statistical data based on the accumulated speed information.

* * * * *